J. H. SAWYER.
ATTACHMENT FOR HAY PRESSES.
APPLICATION FILED JAN. 21, 1913.
1,071,587.
Patented Aug. 26, 1913.
4 SHEETS—SHEET 1.
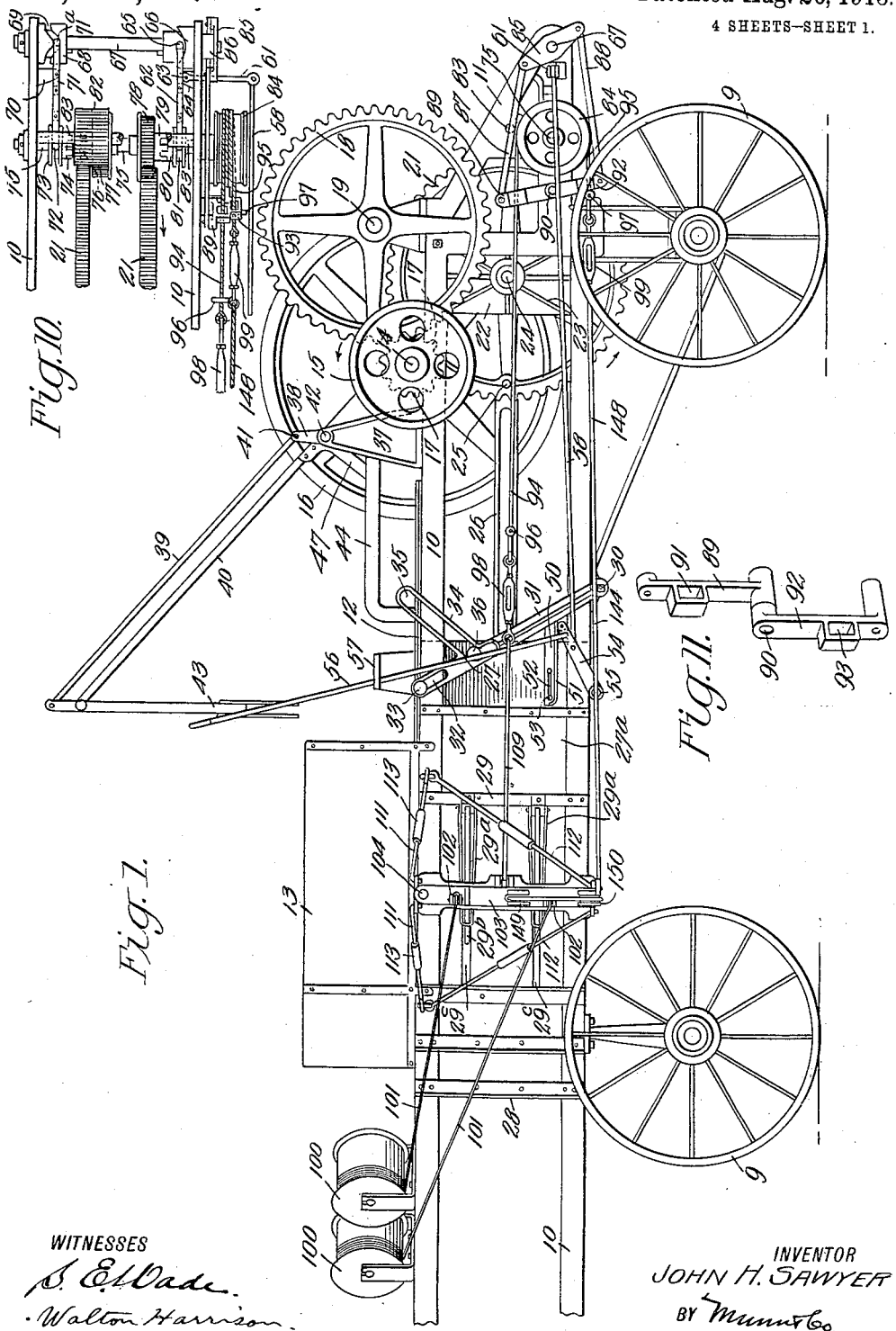
WITNESSES
INVENTOR
JOHN H. SAWYER
BY
ATTORNEYS

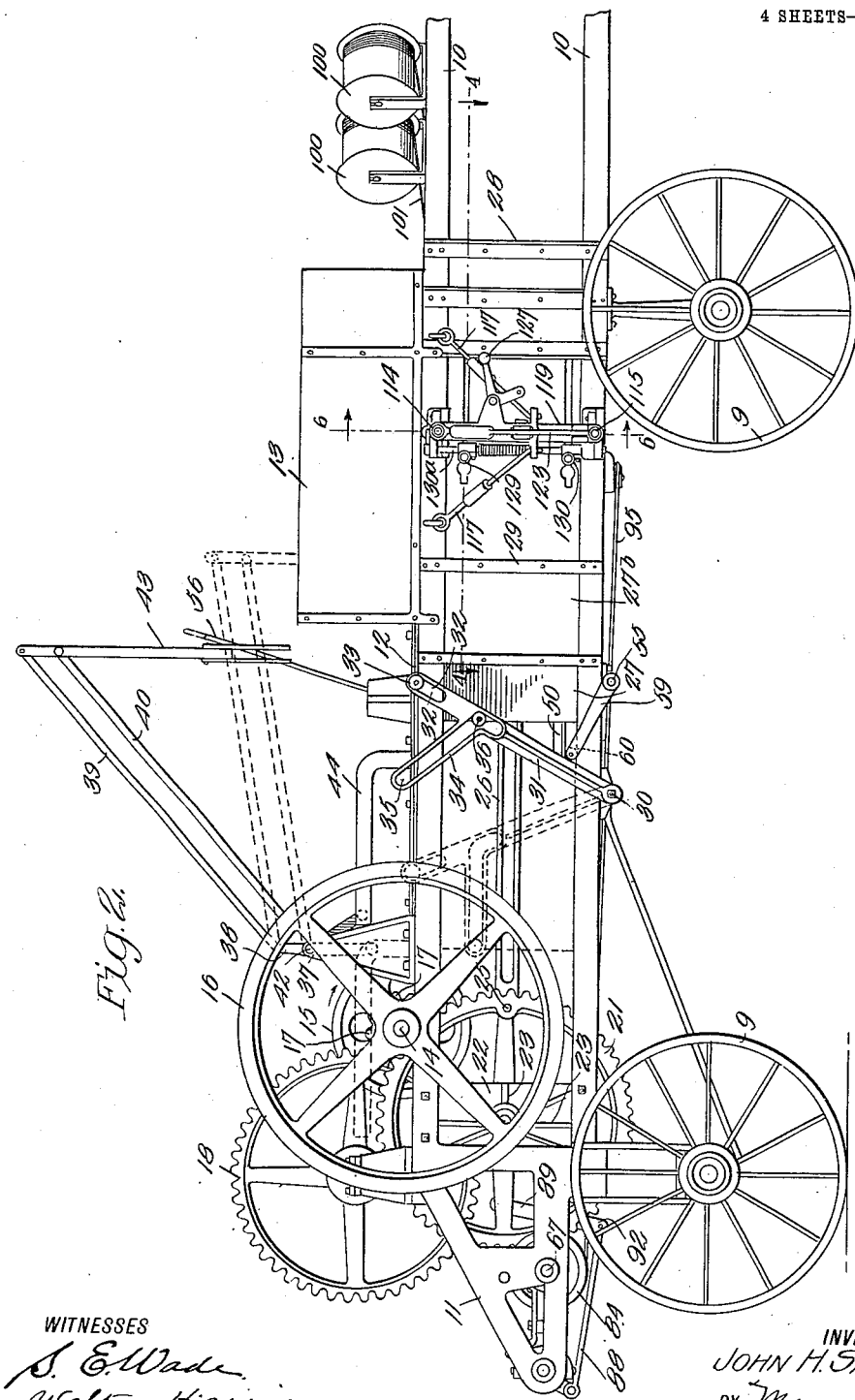

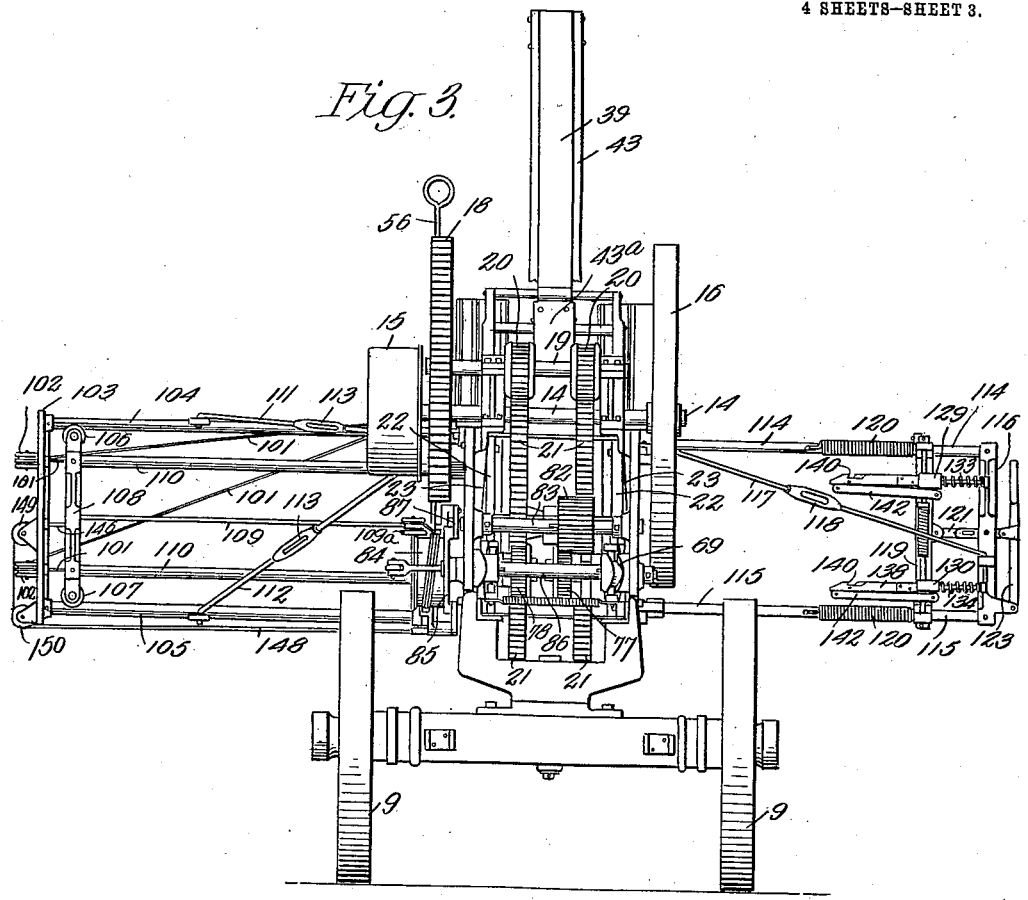

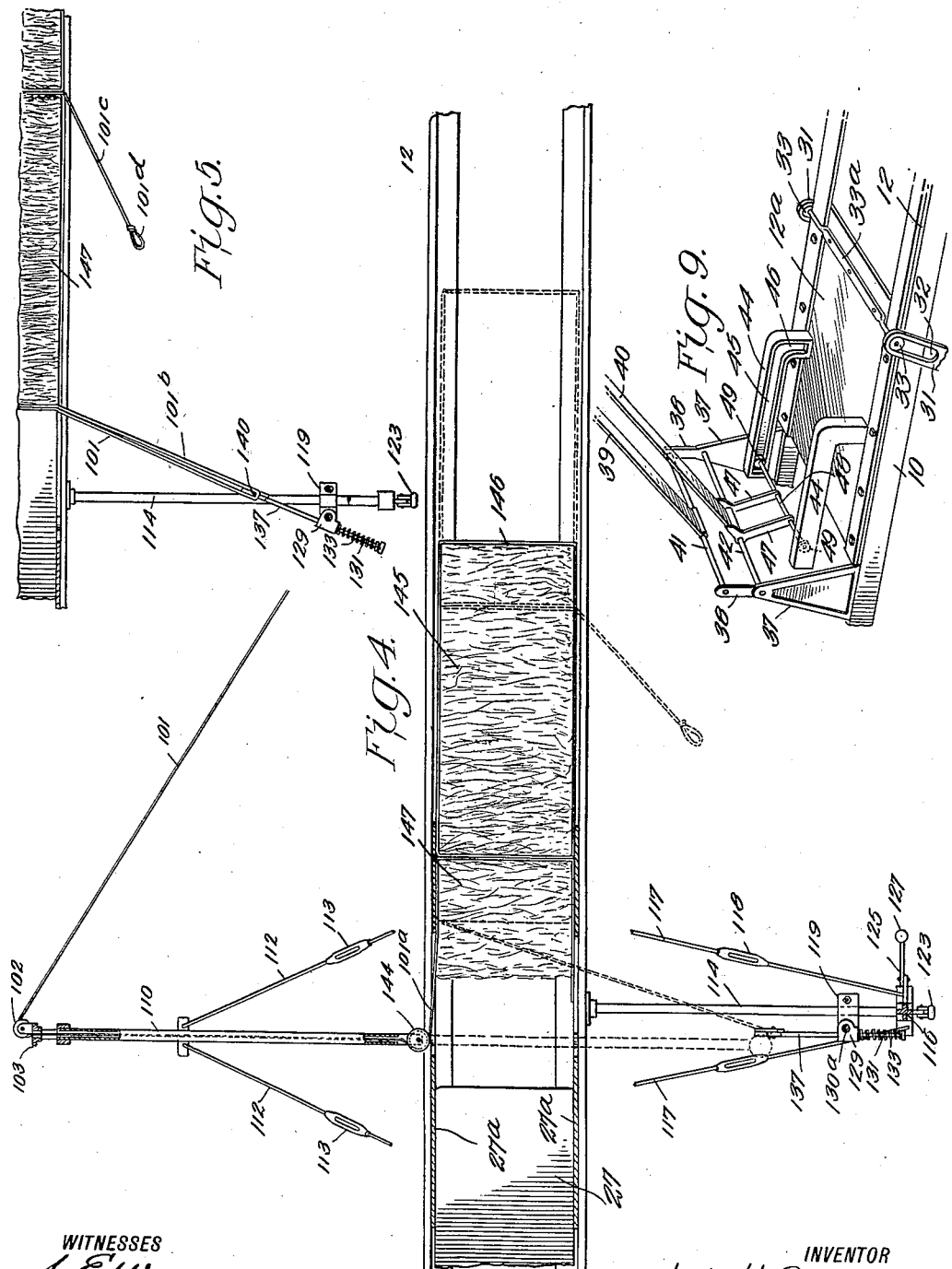

UNITED STATES PATENT OFFICE.

JOHN H. SAWYER, OF LEXINGTON, KENTUCKY, ASSIGNOR OF ONE-FOURTH TO FRED A. FORSYTHE, OF HARRODSBURG, KENTUCKY.

ATTACHMENT FOR HAY-PRESSES.

1,071,587. Specification of Letters Patent. Patented Aug. 26, 1913.

Application filed January 21, 1913. Serial No. 743,321.

*To all whom it may concern:*

Be it known that I, JOHN H. SAWYER, a citizen of the United States, and a resident of Lexington, in the county of Fayette and State of Kentucky, have invented certain new and useful Improvements in Attachments for Hay-Presses, of which the following is a specification.

My invention relates to presses and more particularly hay presses, my more particular purpose being to provide a device which may be used as an attachment for the hay press, or may be supplied with the press as originally built, for the purpose of facilitating the placing of the ties or hoops upon the bales, where the ties or hoops are made of wire supplied directly from reels.

More particularly stated, my invention comprehends mechanism controllable in part at the will of the operator and in part automatically for threading the wire through the press and around the unfinished bale; for tightening the wire around the bale; and for measuring and cutting the wire into proper lengths to avoid waste of the wire.

My invention further comprehends various improvements related to the wiring of the bales and having for their purpose the general efficiency of the apparatus and the saving of time of the operatives.

My invention is of general use but is of peculiar service in connection with small baling presses mounted upon wheels or otherwise rendered portable and operated by steam or the like for the purpose of compressing hay into bales of standard size and density.

Reference is made to the accompanying drawings forming a part of this specification and in which like letters indicate like parts.

Figure 1 is a side elevation showing a portable hay press provided with my attachment; Fig. 2 is a side elevation showing the side of the machine opposite the one shown in Fig. 1. Fig. 3 is an end elevation of the machine complete as the same would appear to an observer standing to the left of Fig. 2; Fig. 4 is a fragmentary section on the line 4—4 of Fig. 2 looking in the direction of the arrow; Fig. 5 is a detail showing a section somewhat similar to Fig. 4, and indicating the manner in which the wire is passed around the unfinished bale; Fig. 6 is a section on the line 6—6 of Fig. 2 looking in the direction of the arrow and showing the mechanism for tightening and cutting the wires; Fig. 7 is a section on the line 7—7 of Fig. 6, looking in the direction of the arrow; Fig. 8 is a section on the line 8—8 of Fig. 6 looking in the direction of the arrow; Fig. 9 is a fragmentary perspective showing parts of the feeder mechanism; Fig. 10 is a fragmentary plan of the rear end of the machine showing the gearing; and, Fig. 11 is a detail showing in perspective the rocking arms used in connection with the reversing mechanism.

Mounted upon road wheels 9 is a skeleton frame 10 provided with a rearwardly extending portion 11. The top of the frame 10 is provided with a horizontally disposed slideway 12 in which is mounted a slide $12^a$ as will be understood from Fig. 9, this slide $12^a$ forming practically a part of the feeder mechanism, as hereinafter described. Mounted upon the frame 10 and extending upwardly therefrom are hopper boards 13 between which the material is fed in separate charges. Extending over the frame 10 and journaled thereupon is a shaft 14 which is provided at one of its ends with a driving pulley 15 and at its opposite end with a fly wheel 16. Mounted rigidly upon the shaft 14 is a pinion 17 which meshes with a gear wheel 18. This gear wheel is mounted rigidly upon a shaft 19. Two pinions 20 are likewise mounted rigidly upon this shaft 19. These two pinions mesh with two large gear wheels 21. These two wheels are exactly alike and are located between two bearing plates 22, the latter being provided with strengthening ribs 23. Journaled within the bearing plates 22 is a shaft 24 upon which the two gear wheels 21 are rigidly mounted. A crank pin 25 extends through both of the gear wheels 21. Connected to this crank pin is a large pitman 26, the latter being connected to the plunger which is shown at 27 and is slidably mounted within the frame 10.

Mounted upon opposite sides of the frame are side boards $27^a$ and $27^b$ which aid in holding the material to be formed into bales. Braces 28 are mounted upon opposite sides of the frame and serve to strengthen the same as well as facilitate the formation of the bale. One of the braces 29 (see Fig. 1)

carries a pair of springs 29ª to which are secured retainers 29ᵇ, the latter extending through slots 29ᶜ within the side board 27ª and being used for the purpose of retaining the partially compressed material. A rocking shaft 30 is journaled upon the underside of the frame 10 and extends across the same. Mounted upon the ends of this rocking shaft 30 are cam levers 31 provided respectively at their upper ends with slots 32. Located within these slots are rollers 33 which are mounted upon the slide 12ª by aid of a cross bar 33ª, as will be understood from Fig. 9. Each cam lever is provided with a branching portion 34 extending obliquely upward toward the front of the machine and provided with a slot 35. Two rollers 36 are mounted upon opposite sides of the plunger 27 and extend through the slots 35 as will be understood from Figs. 1 and 2. Mounted upon the frame 10 and extending upwardly therefrom are two bearing standards 37 provided with upwardly extending portions 38. Located between the upwardly extending portions 38 is a board 39 which is mounted upon a shaft 41, the ends of this shaft being journaled in said upwardly extending portions 38 as will be understood from Fig. 9. Another board 40 is mounted upon a shaft 42, the latter extending across from one of the standards 37 to the other. Connected with the board 40 and with the shaft 42 are two arms 47 which extend downwardly and carry a shaft 48. Rollers 49 are mounted upon the ends of this shaft and extend into grooves 45. Mounted upon the slide 12ª and carried thereby are two cam pieces 44 in which the grooves 45 are formed. These grooves 45 are provided with downwardly extending portions 46. The parts are so arranged that when the slide 12ª is moved to the left according to Fig. 9 the rollers 49 follow the grooves 45, and drop downwardly into the portions 46 of these grooves whenever the slide 12ª is at the extreme limit of its travel to the left according to Fig. 9. The descending of the rollers 49 causes the arms 47 to rock the boards 39, 40 carrying a feeder fork 43, which is lowered with each descent of the boards 39—40.

Power, being applied to the wheel 15, is transmitted through various gears and pinions to the two gear wheels 21 and as these turn, the pitman 26 causes the plunger 27 to reciprocate within the frame 10. The rollers 36, being carried by the plunger, cause the cam levers 31 to rock and in so doing actuate the slide 12ª. When the cam levers 31 rock toward the front of the machine (to the right according to Fig. 1) into such position that the slots 35 become horizontal, the rollers 36 may then move farther to the right so as to reach the limit of their travel, the slide 12 being for the moment stationary. Upon the return stroke of the plunger the slide is started into motion. Each time the slide 12ª moves forwardly the feeder fork 43 descends and forces downwardly such material as may have been fed in between the hopper boards 13.

The material is fed into the press a little at a time, the plunger making a complete forward and backward stroke, after each charge is fed in and the feeder fork descending and ascending once for each stroke of the plunger. Mounted upon opposite ends of the plunger and at the front end thereof are two guides 50 each having substantially the form of a short rail and provided at its lower edge with a bearing surface 51. Each guide 50 is further provided with a slot 52 through which extend pins 53 for the purpose of holding the guide in position upon the plunger and also to render it adjustable within reasonable limits relatively to the plunger. Mounted upon one side of the frame 10 and located near the bottom thereof (see Fig. 1) is an arm 54 which is secured rigidly upon the rocking shaft 55, extending across the underside of the frame 10. A handle 56 having generally the form of a long rod, is pivotally connected with the arm 54 and extends upwardly through a stationary guide 57 carried by the frame. Pivotally connected with the arm 54 and extending forwardly therefrom is a long rod 58. Mounted upon the end of the shaft opposite the arm 54 is another arm 59 (see Fig. 2) this arm being provided with a roller 60 which engages the underside of the adjacent guide 50 carried, as above stated, by the plunger. The forward end of the rod 58 is pivotally connected with the outer end of a lever 61 as shown in Fig. 10. This lever carries a portion 62 extending in the general direction of the length of the machine and adapted to be rocked whenever the lever 61 is actuated. The lever 61 is journaled upon the bearing 64 by aid of a pin 63 and carries a roller 65. Adjacent to this roller is a cam 66, which is mounted rigidly upon a shaft 67. This shaft is provided with another cam 68 having a cam groove 69.

Mounted upon the frame 10 is a bearing plate 70 and journaled upon the latter is a clutch lever 71 provided with a fork 71ª extending at its ends into the cam groove 69. The clutch lever 71 is further provided with a fork 72 which engages a clutch member 73, the latter being provided with a clutch face 74 and being splined upon a shaft 75. A pinion 77 is provided upon one side with a clutch face 76 mating the clutch face 74. The pinion 77 is mounted upon the shaft 75 and is loose relatively to the same but is adapted to turn therewith when the clutch face 74 is in engagement with the clutch face 76. Another pinion 78 is mounted upon the shaft 75 and meshes with the adjacent gear wheel 21.

The pinion 78 is provided with a clutch face 79. A clutch member 81 is splined upon the shaft 75 and is provided with a clutch face 80 mating the face 79. A gear pinion 82 is mounted rigidly upon a revoluble shaft 83 and has a thickness approximately double that of the pinion 77. The pinion 82 meshes with the pinion 77 and also with the adjacent gear wheel 21.

Mounted rigidly upon the shaft 75 is a drum 84 which is located outside of the frame 10. Near the drum 84 is a lever 85 which is rigidly secured to the shaft 67 by aid of a hub 86 with which the lever in question is provided. Pivotally connected with the upper end of the lever 85 is a rod 87. Another rod 88 is firmly connected with the lower end of the lever 85. The rod 87 is pivotally connected with an arm 89, the latter being mounted upon a pin 90 which is journaled upon the frame. The arm 89 is provided with an eye 91. Another arm 92 is secured to the pin 90 and extends downwardly therefrom, this arm being provided with an eye 93, as will be understood from Fig. 11.

A cable 94 is partially wound upon the drum 84 and is secured directly to this drum. Another cable 95 is likewise partially wound upon the drum 94 and secured to the same. The two cables 94—95 may if desired be practically a single continuous cable. The cable 94 carries a button 96 and the cable 95 similarly carries a button 97, these buttons being adapted to be thrown respectively against the eyes 91—93 when the rotation of the drum 84 is carried beyond certain limits, and the buttons by lodging against the eyes as stated cause the arms 89—92 to rock. The cables 94—95 are provided with turn-buckles 98—99 for purposes of adjustment.

The mechanism shown in Fig. 10 is for the purpose of controlling the direction of rotation of the drum 84, that is for rendering the drum idle or for suddenly reversing its direction of travel. The shaft 67 is normally stationary and the various movable parts shown in Fig. 10 normally occupy the respective positions indicated in this figure. The fork 65 is now out of engagement with the cam 66. While the device is in action the gear wheels 21 are turning in a contraclockwise direction according to Fig. 1 and the pinion 78 is rotating idly. If now the rod 58 is shifted to the left according to Figs. 1 and 10, the clutch face 80 engages the clutch face 79 and at the same time the fork 65 moves to the limit of its travel against the adjacent portion of the clutch face 66. The clutch faces 79—80 being thus in engagement, the pinion 78 turns in a clockwise direction, according to Fig. 1, the drum 84 turning in the same direction and drawing the cable 94. As soon however as the button 97 reaches the eye 91 of the arm 89, this arm is swung to the right, that is turned slightly in a clockwise direction, according to Fig. 1, the arm 92 being swung to the left.

The arms 89—92 by actuating the rods 87—88 cause the lever 85 to rock slightly in a clockwise direction according to Fig. 1. This rocks the shaft 67 and the cams 66—68. The cams 66 by shifting the lever 61 force the clutch face 80 out of engagement with the clutch face 79 and this leaves the pinion 78 free so that it now turns idly. The cam 68 by shifting the position of the lever 71 throws the clutch face 74 into engagement with the clutch face 76 and this causes the pinion 77 to turn with the shaft 75. Since the pinion 77 up to this time has been running idly, and since this pinion meshes with the pinion 82 carried by the shaft 83, and since the pinion 82 meshes with the adjacent gear wheel 21, it follows that motion is communicated from the gear wheel 21 just mentioned through the pinions 82 and 77 to the shaft 75, and that this shaft now turns in a direction opposite to that which characterized it a moment before, the result being that the drum 84 is now reversed in its direction of travel and turns in a clockwise direction according to Fig. 1. At the instant that the reversal takes place, the button 97 is some distance from the eye 93 carried by the arm 92. As soon, however, as the button reaches the eye 93 it shifts the arms 92 and 89 back to their original or initial positions, as indicated in Fig. 1. The apparatus is now left in the position it normally occupies, and by the disconnection of the clutch face 74 from the clutch face 76 the shaft 75 and the drum 84 carried by it are rendered idle. The net result is that whenever the rod 58 is given a pull toward the left, according to Fig. 1, the drum 84 begins to turn in a clockwise direction, according to this figure, and a moment later the drum stops and begins to turn in the opposite direction, its rotation being continued for a moment after, when it again stops. The operator in order to shift the rod 58 to the left for the purpose indicated, pulls the handle 56 upwardly. The guides 50 carried upon opposite sides of the plunger serve to prevent the upward movement of the arms 54—59 and the consequent pulling of the rod 58 except under conditions where the plunger has moved a sufficient distance, from the beginning of its stroke, to insure that the guides are clear of the arm 54. This arrangement is for the protection and proper timing of the travel of the needle carriage relatively to the movement of other parts of the machine, as hereinafter explained.

Mounted upon the rear end of the frame 10 are two reels 100 carrying the wires 101 which are used for tying bales. The two wires 101 engage small pulleys 102 which are carried upon a plate 103 forming a part of the carriage frame. The plate 103 is secured to the outer ends of two horizontal posts 104—105 of tubular form, these posts being detachably secured to the frame 10. Engaging the posts 104—105 are rollers 106—107, the latter being mounted upon the ends of a vertically disposed needle head 108.

A cable 109 is connected with the middle portion of the needle head 108. This cable engages a pulley 109ᵃ and is secured to the turn-buckle 98 so as to constitute practically a continuation of the cable 94, as will be understood from Fig. 1. Secured to the needle head 108 are two needles 110 which are of tubular form, and adapted to be moved endwise by movement of the needle head 108. Detachably connected with the post 104 are stay rods 111 provided with turn-buckles 113. Similar stay rods 112 provided with turn-buckles 113 are connected with the post 105.

Mounted upon the frame 10 are two posts 114—115 which extend to the right, according to Fig. 3. These posts carry a bar 116. Detachably connected with this bar and with the frame 10 are stay rods 117 provided with turn-buckles 118. Slidably mounted upon the posts 114—115 is a vertically disposed head 119 and connected with this head are springs 120, the latter being also connected with the posts 114—115. Connected with the head 119 is a link 121 and connected with the latter is another link 122. A hand lever 123 is journaled upon the bar 116 and is connected with the link 122. A stop pin 124 is pivotally mounted upon the lower end of the bell crank lever 125, the latter being mounted upon a pin 126 carried by the bar 116. The bell crank lever 125 carries a weight 127 which tends to thrust the pin 124 endwise. When the weight 127 is in its normal position, as indicated in Fig. 7, the pin 124 extends through the link 122 and prevents movement of the bar 119. The pin 124 carries a collar 128 which serves the purpose of a limiting stop for preventing excess travel of the pin, as will be understood from Fig. 7.

Two bearing sleeves 129—130 are journaled upon the bar 119 and have a slight rocking movement relatively to the same. To facilitate connection between these bearing sleeves and the bar 119 I employ a pivot rod 130ᵃ, as indicated in Fig. 8. Extending through the bearing sleeves 129—130 are rods 131—132, and encircling these rods are spiral springs 133—134. These spiral springs engage heads 135—136 with which the rods 131—132 are provided. Mounted upon the rods 131—132 are two plates 137—138 each provided with a notch 139 and with a cutting edge 140, the latter having such shape as to perform to some extent the purpose of a hook. Pivotally mounted upon each plate 137 is a blade 141 and pivotally connected with this blade is a bar 142, this bar being also connected with the bar 119 by a pivot pin 143.

The mechanism thus described and shown in Fig. 6 and at the right of Fig. 3 co-acts with the needles for the purpose of measuring, tightening and cutting the wires, as hereinafter described. Connected with the head 108 (see left of Fig. 3) is a cable 148 which extends partially around two pulleys 149—150 mounted upon a plate 103 and thence extends horizontally into engagement with the turn-buckle 99, as may be understood from Fig. 1.

A finished bale is shown at 145 in Fig. 4 and is tied by two bands one of which appears at 146. An unfinished band or tie partially surrounding this unfinished bale is indicated by the portion 101ᵃ of the tie wire 101. In Fig. 5 the unfinished bale is shown at 147 and various portions of the tie wire, being formed into a hoop or tie are shown at 101ᵇ, 101ᶜ and 101ᵈ, the portion 101ᵈ being formed by hand into a loop to facilitate connection of the ends of the hoop.

The operation of my device is as follows:—The material to be baled (in this instance hay) is stuffed down between the hopper boards 13 and into the adjacent portion of the frame 10. The parts shown in Fig. 10 now occupy their respective normal positions and the drum 84 is idle. Power being applied to the pulley 15 so as to turn the same continuously in a contra-clockwise direction, according to Fig. 1, the gear wheels and pinions are operated as above described. The plunger 27 makes repeated thrusts into the baling chamber and compresses the hay therein contained. The retainers 29ᵇ 29ᶜ being pressed inwardly by the springs 29ᵃ, serve to hold the partially compressed material. This compressed material, or in other words the unfinished bale, grows gradually longer. The operator watches the process and when the unfinished bale acquires the proper length, he grasps the handle 56 and pulls upwardly upon it. This shifts the rod 58 to the left according to Fig. 1. The operator may happen to pull upwardly upon the handle 56 before the guides 50 are clear of the arms 54. In this event the operator is unable to raise the handle 56 for a moment, but as soon as the plunger 27 moves far enough to the right, according to Fig. 1, to free the arms 54 the rod 56 is pulled up by hand.

The shifting of the rod 58 to the left, as above described, causes the lever 61 to rock and this thus begins the cycle of operations above described with reference to Fig. 10.

As soon as the rod 56 is pulled upwardly the drum 84 begins to turn, in a clockwise direction, according to Fig. 1, and to draw in to wind up the cable 94, thus pulling upon the cable 109. The needle head 108 is thus moved to the right, according to Fig. 3, so that the needles 110 are thrust directly through the frame 10 so as to protrude from the opposite side thereof. The needles do not interfere with the plunger and the plunger is unable to interfere with the needles, because the plunger is now out of the way, having necessarily moved some distance to the right, according to Fig. 1. As above explained with reference to the clearance of the arms 54, 59, the needles 110 quickly make their stroke across and these needles carry the two wires 101. These wires are threaded through the frame 10 and across the adjacent surface of the material to be baled. The needles continue their thrust movement until the wires are brought into engagement with the plates 138. Owing to the form of these plates the wires lodge in the notches 139 and thus hang upon the cutting or hooked edges 140. At this instant the reversal of the drum 84 takes place, as above described. The drum thus begins to turn in a contra-clockwise direction according to Fig. 1. This reverse movement of the drum unwinds the cable 94 and winds up the cable 95. Since this cable 95 is practically a continuation of the cable 148 the eye 97 moves to the right, according to Fig. 1, and trips the arm 92, as above explained. This moves the arm 89 and through the cycle of operations elsewhere described brings the drum 84 to a stop.

An operator stands adjacent to the hand lever 123 and whenever the wires 101 are hung upon the cutting edges 140, as above described, the operator pulls the lever 123. This moves the bar 119 to the right, according to Fig. 3, so that the springs 120 are stretched, as indicated in Fig. 6. The pin 124 now prevents the link 121 from returning to its initial position, and consequently the wires 101 are held under considerable tension, this tension being controlled by the strength of the springs 133. Further action of the press—that is to say repeated thrusts of the plunger—now increases the tension upon the wires 101 so that the springs 133—134 are compressed to a considerable extent. The blades 141 are, therefore, rocked relatively to the plates 137—138 and the wires 101 are thus severed. During this step the movement of the incomplete bale causes the plates 137 to swing upon their pivotal supports, as will be understood from Fig. 5.

The cutting of the wire leaves a portion 101$^b$ (see Fig. 5) of proper length to be secured to the loop 101$^a$, thus enabling the operator to tie the incomplete bale 147. The adjacent portion of the wire 101 is thus left free and of proper length to begin the banding of the next successive bale.

As indicated in Fig. 4 the finished bale 145 is pushed endwise out of the press, while the next successive bale 147 is being formed. The cutting of the wire is practically automatic. In practice the operator merely actuates the hand lever 123 once for each bale and as soon as the wire is cut he ties the two loops upon one bale and forms loops in the adjacent portions of the wire 101 so as to start the next bale.

I do not limit myself to the precise mechanism shown, as variations may be made in the device without departing from the spirit of my invention. As elsewhere indicated, the invention may be incorporated into the construction of the press at the time when the press is built or it may be added afterward as an attachment.

I claim:—

1. The combination of a press provided with a baling chamber, a needle carriage movable toward and from said baling chamber, needles mounted upon said needle carriage, means for supplying wire continuously to said needles, hooks located adjacent to the path of travel of said needles for engaging the wires carried thereby, means controllable at the will of the operator for pulling upon said hooks in order to tighten the wires, so that further tightening of the wire due to bodily movement of an unfinished bale will cause said hooks to cut said wires.

2. An attachment for presses comprising a needle carriage, means for moving the same toward and from the press, needles mounted upon the needle carriage and movable endwise across the general direction in which the baling chamber of the press extends, means for supplying wire to said needles, hooks disposed adjacent to the path of travel of said needles and adapted to engage the wires carried thereby, said hooks being provided with cutting surfaces for severing said wires, pivotal mountings for supporting said hooks so as to allow the same to swing to different angles, means for pulling upon said hooks when said hooks are in engagement with the wires, for the purpose of tightening said wires, so that further tightening of said wires due to the bodily travel of an unfinished bale shall sever said wires.

3. In an attachment for presses, the combination of a needle carriage, needles carried thereby, means for moving said needle carriage toward and from said press in order to thrust said needles through and withdraw the same from said press, gearing connected with said needle carriage for actuating the same, said gearing including a drum and connections from said drum to said needle carriage, and means for changing the direction of travel of said drum.

4. In an attachment for presses, the combination of a needle carriage, needles carried thereby, means for moving said needle carriage toward and from said press in order to thrust said needles through and withdraw the same from said press, cables connected with said needle carriage for moving the same, a drum connected with said cables for carrying the latter, mechanism for reversing the direction of travel of said drum, and means for enabling movements of said cables to actuate said mechanism.

JOHN H. SAWYER.

Witnesses:
W. J. HICKEY,
BERT MILLER.

Copies of this patent may be obtained for five cents each, by addressing the "Commissioner of Patents, Washington, D. C."